United States Patent [19]

Michaels

[11] 4,350,840
[45] Sep. 21, 1982

[54] CORD GRIP

[75] Inventor: Leonard H. Michaels, Warrenville, Ill.

[73] Assignee: Ideal Industries, Inc., Sycamore, Ill.

[21] Appl. No.: 246,030

[22] Filed: Mar. 20, 1981

[51] Int. Cl.³ ............................................. H02G 3/22
[52] U.S. Cl. .................. 174/65 SS; 285/330; 285/343; 279/1 Q; 279/56; 279/107
[58] Field of Search .............. 174/65 R, 65 SS, 151; 285/158, 342, 343, 354, 330, 382.7; 339/103 R, 103 B, 103 C, 107; 248/56; 279/106, 107, 1 Q, 56, 59

[56] References Cited

U.S. PATENT DOCUMENTS 3,058,762 10/1962 Howe ............................. 285/354 X
3,248,135 4/1966 Meripol ........................... 285/343 X Primary Examiner—B. A. Reynolds
Assistant Examiner—D. A. Tone
Attorney, Agent, or Firm—Kinzer, Plyer, Dorn & McEachran

[57] ABSTRACT

This is concerned with a cord grip for use with various types of electrical cord and more specifically involves a compression chamber with a distortable grommet which has independent gripper elements that are socketed into the grommet so that the gripper elements perform a compound closing action on the cord with the result that the cord grip has great flexibility as to the range of sizes and types of cords it will accept and as to the type of gripping action it will perform on different sizes of cords.

37 Claims, 12 Drawing Figures

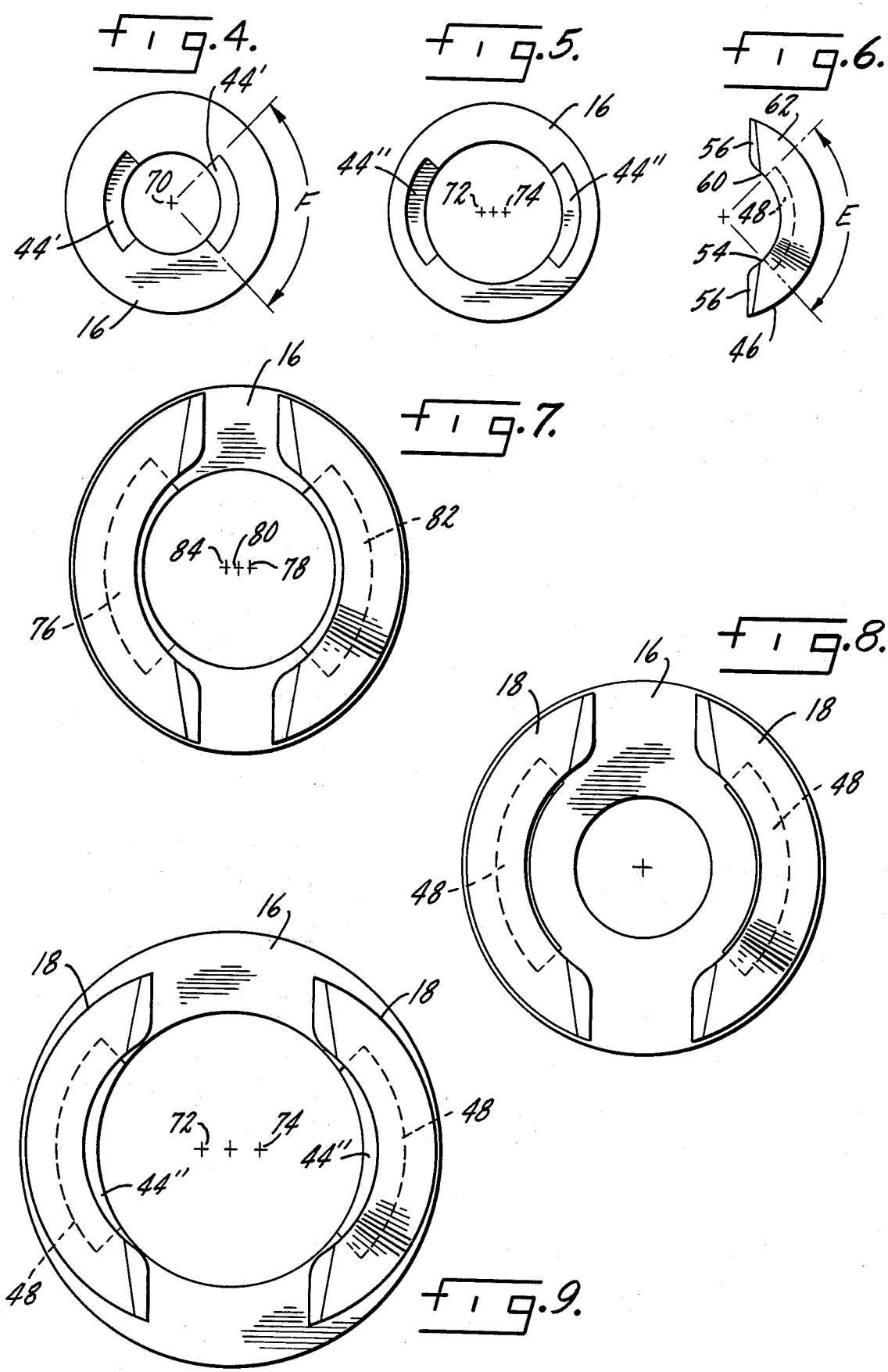

4,350,840

CORD GRIP

SUMMARY OF THE INVENTION

This invention is concerned with a cord grip or cord grip connector and is more specifically of the type for providing a liquid tight joint.

A primary object of the invention is a cord grip which provides an extended range capability, meaning it will handle a larger number of cord sizes.

Another object is a cord grip of the above type which provides improved gripping without losing any of its sealing effectiveness.

Another object is a unit of the above type which is quite economical with a few parts and is easy for the customer to apply.

Another object is a cord grip of the above type in which gripper elements perform a pivoting or rocking action.

Another object is a cord grip in which the grippers perform a compound action or movement.

Another object is a grommet unit to go in a cord grip housing in which while the gripper elements are separate, they are socketed into the grommet so that they provide or are a unitary structure therewith.

Another object is a cord grip of the above type which has a better gripping action, meaning that it takes a better "bite" on the cord.

Another object is a cord grip which will function quite effectively with a larger range or different durometer jackets on the cord.

Another object is a cord grip of the above type which operates on a balancing-of-forces principle rather than on fixed mechanical dimensioning.

Another object is a cord grip of the above type which extends its range capabilities by balancing, first, the forces between the rubber and the gripper element, second between the gripper elements and the jacket on the cord and, third, between the rubber of the grommet and the jacket of the cord.

Another object is a cord grip of the above type in which the grippers perform a complex or compound movement and the movement varies depending upon the size of the cord and/or the durometer of its jacket.

Another object is a cord grip of the above type which will accommodate itself to a lot of variables.

Another object is a cord grip of the above type which has or provides a high pullout force.

Another object is a cord grip of the above type which relies upon or uses a scissors action of its gripping elements.

Other objects will appear from time to time in the ensuing specification and drawings.

BRIEF DESCRIPTION OF THE DRAWINGS

FIG. 4 is an end view of one form of the grommet.

FIG. 5 is an end view of a variant form of grommet.

FIG. 6 is an end view of one of the gripper elements.

FIG. 7 is an end view of the gripper elements assembled into a grommet.

FIG. 8 is an end view of the assembled gripper elements and grommet but of a different grommet.

FIG. 9 is an end view of the assembled grippers and grommet of a still further variant.

BRIEF DESCRIPTION OF THE PREFERRED EMBODIMENTS

Figure 1:
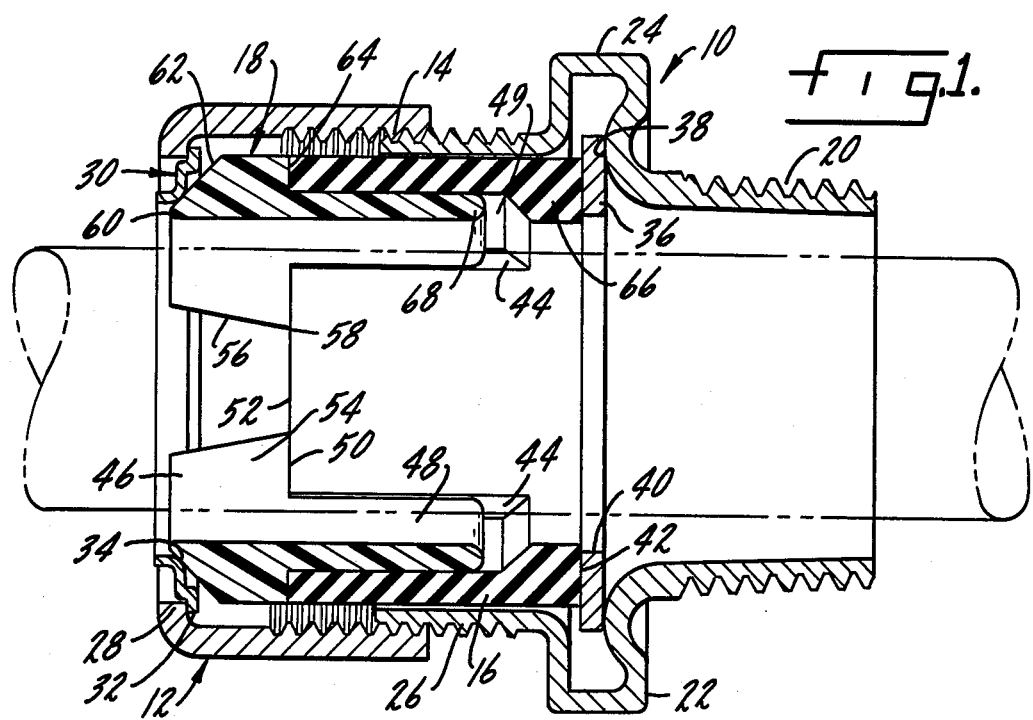
FIG. 1 is a side view in section of the cord grip.

In FIG. 1 a housing is defined by a shell element 10 and a cap 12 which are screw threaded together at 14 to define a compression chamber for a grommet assembly which is made up of a grommet 16 and gripper elements 18.

The far or inner end of the shell 10 has a threaded portion 20 so that the entire assembly may be mounted on a box, a panel, etc. The intermediate portion of the housing is deformed outwardly into a flange 22 which may have a polygonal shaped outer surface 24 with flats thereon to accept a wrench or any conventional tool. The forward portion of the housing, as at 26 has threads to accept the cap 12 which is turned inwardly on its outer end as at 28 to accept a bearing ring 30 which overlaps the inturned portion of the cap, as at 32 and extends inwardly sufficiently with an innerbearing surface 34 to function or operate with the gripping elements 18 as explained hereinafter.

A washer 36 is positioned in the housing against a shoulder 38 and has an inside diameter 40 of a certain size larger than the maximum cord size.

The grommet assembly has, first, the grommet 16 itself which is generally annular and may be made of rubber or a suitable rubber substitute or a suitable material having rubberlike characteristics as to distortability and compressibility. The rear surface 42 of the grommet abuts the washer and the forward portion of the grommet accepts the gripper elements 18. As shown in FIG. 1 the inner surface of the grommet has arcuate cavities or cutouts 44.

The gripper elements 18 are each defined by or include a head element 46 which is on the forward portion thereof with a shank 48 extending rearwardly therefrom and accepted or positioned in the cavity 44 in the distortable grommet with a slight spacing 49 at the rear. The head and shank of the gripper elements come together in an abutting surface 50 which is flush against the forward face 52 of the distortable grommet. Each of the grippers is provided with an inner arcuate surface 54 which is semi-cylindrical or arcuate and extends all the way through the head and shank. When the gripper elements are positioned in the grommet, as shown in FIG. 1, it will be noted that this inner arcuate or curvilinear surface of the gripper elements at least in part defines a cord passage through the grommet, a cord being shown in phantom lines in FIG. 1.

The outer surfaces 56 of the forward inner portions of the grommet gripper elements are inclined inwardly and terminate in an edge or pivot point 58. The leading edge 60 of the gripper elements, which is somewhat rounded, functions as a biting area to indent or compress the cord, as explained hereinafter. The outside forward surface of the gripper elements are inclined or on a dihedral, as at 62 and oppose the inner inclined surface 34 of the bearing ring 30. The merging surface 50 of the head and shank of the gripper elements abut the forward face of the distortable grommet, both in an arcuate area on the outside of the gripper elements as at 64. The rear portion or area of the grommet, as at 66, behind or beyond the shanks of the gripper element is formed inwardly to provide a solid annular compression ring or annulus for engaging the outside of the cord jacket.

Figure 2:
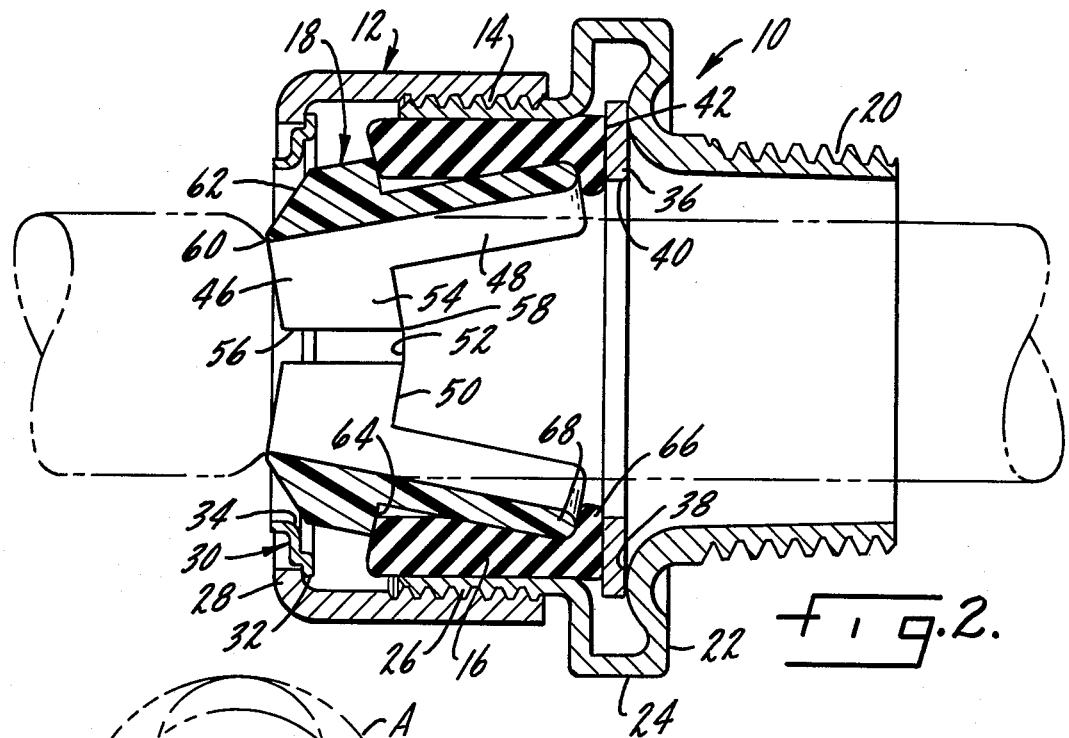
FIG. 2 is similar to FIG. 1 but of a different operative position.

In use, after a cord has been positioned through the unit, the cap and the shell are screwed together which axially reduces the volume of the compression chamber provided between the forward bearing ring 30 and the rear abutment which is washer 36. The inclined forward faces 62 on the outside of the gripper elements engage the inside of the bearing ring 30. This tends to thrust the grippers rearwardly thereby applying compression to the distortable grommet at surfaces 64. This thrusts the rear surface 42 of the distortable grommet against the washer 36. The grommet will thus be axially compressed which tends to force the rear annulus 66 inwardly. At the same time the inclined or beveled face 62 on the front of the grippers tends to force the head elements of the grippers inwardly. This results in a pivoting action of each of the gripper elements about the rear end 68 of the shanks. Depending upon the size of the cord the gripper will pivot more or less, depending upon when its forward gripping area 60 engages the outer surface or jacket of the cord. Thereafter, further shortening of the compression chamber causes the edges 60 to indent the cord jacket. At the same time the rear end 68 of the shanks of the gripper elements will tend to expand or be forced out thereby distorting the surrounding portion of the grommet both circumferentially and axially enhancing the distortion of the rear annulus 66 of the grommet. This combination of axial, radial and circumferential distortion of the grommet in the area bounding the shanks of the gripper element, behind the gripper elements at 66, and between the gripper elements results in a differential flow and distortion of the grommet causing it to grip the cord in the area 66 90° out of phase with the gripping action of the gripper elements 18 on the cord. This can probably be best viewed in FIG. 3 where the action is shown schematically. The outer circle A represents the initial or relaxed state of the outside surface of the grommet and gripper elements with the outside of the cord being represented at B. When the unit has been fully tightened down, the cord indenting or biting forward surfaces 60 of the gripper elements will have been moved in, as shown in FIG. 2, thereby defining what may be considered an ellipse, at C in FIG. 3. The rear portion of the distortable grommet will be deformed into a corresponding ellipse, designated D in FIG. 3 which is 90° out of phase with the gripper lips C. This is to say that the distortable grommet will grip inwardly on the sides of the cord at the same time that the gripper elements are biting in on the top and bottom. How far forward from the rear end of the grommet it will compress inwardly into the sides of the cords is determined by a number of factors, for example how tightly the user screws the parts together, the durometer of the cord jacket, the durometer of the distortable grommet, etc. The result is a liquid tight seal around the outside of the cord jacket along with a positive mechanical gripping of the cord.

Various forms of grommets and gripper elements are shown in FIGS. 4 through 9. In FIG. 4 the cutouts or cavities 44' in the inner surface of the grommet to accept the shank 48 of the gripper element are swung on the axis or center 70 of the grommet while in the form shown in FIG. 5 the arcuate cavity 44" on the left is swung on a center 72 offset to the left of the grommet axis and the cavity 44" on the right is swung on an axis or center 74 offset to the right of the grommet axis. The arc E or circumferential extent of the gripper element shanks may be slightly greater than the arc or peripheral extent F of the inner cavity 44 in the grommet so that a mismatch or a slight interference or compression fit is provided. Thus after the shank of the gripper element has been forced into the cavity 44, it will be difficult to inadvertently dislodge. Thus the gripper elements and grommet will function as a unit which means they may be handled, shipped, stored, etc. as one unit. This can also be obtained by other means, for example swinging them on slightly different arcs, etc., without destroying or affecting the operative principle of the unit.

In FIG. 7 the gripper elements have been shown assembled in the grommet and it will be noted that the shanks are swung about centers which are slightly offset from the axis of the grommet. For example, the left shank 76 is swung about a center 78 offset to the right of the grommet axis 80 while the right shank 82 is swung about a center 84 offset to the left of the grommet axis at 80. In FIG. 8 the arc of the shanks is swung on the grommet axis. In FIG. 9 the relationship is the reverse of FIG. 7 and like FIG. 5.

Figure 10:
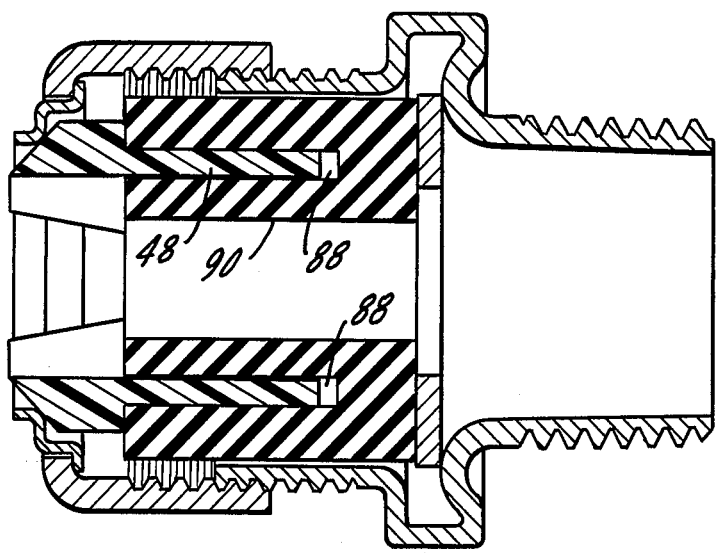
FIG. 10 is a side view in section of a further variant form.

In FIG. 10 a variant form has been shown in which the shanks 48 of the gripper elements fits in sockets 88 which are closed both rearwardly and inwardly but open forwardly so that the material of the grommet provides a more or less continuous cylindrical passage 90 through the grommet element.

Figure 11:
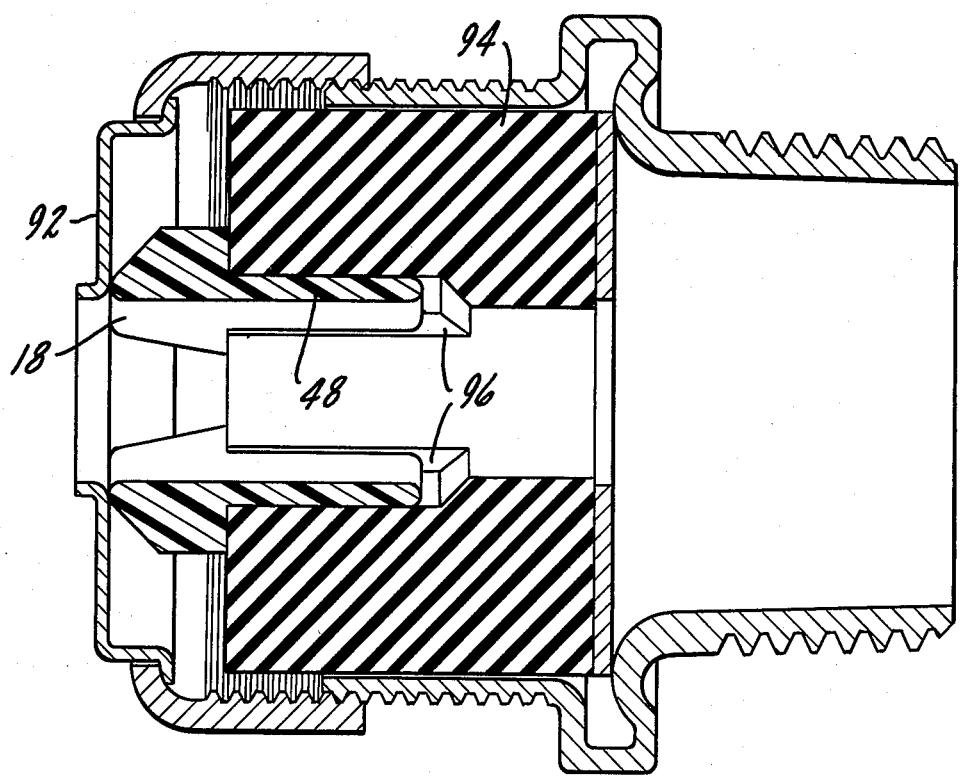
FIG. 11 is a side view in section of an additional form.

In FIG. 11 a further variant has been shown in which the bearing ring 92 in front has been extended and the grommet 94 is enlarged with the grippers being socketed into inwardly open channels 96 so that a somewhat enlarged grommet fills a somewhat enlarged compression chamber with the grippers being more or less the same size as those shown in the previous forms. The action or function or operation of the unit will be more or less the same as before.

Figure 12:
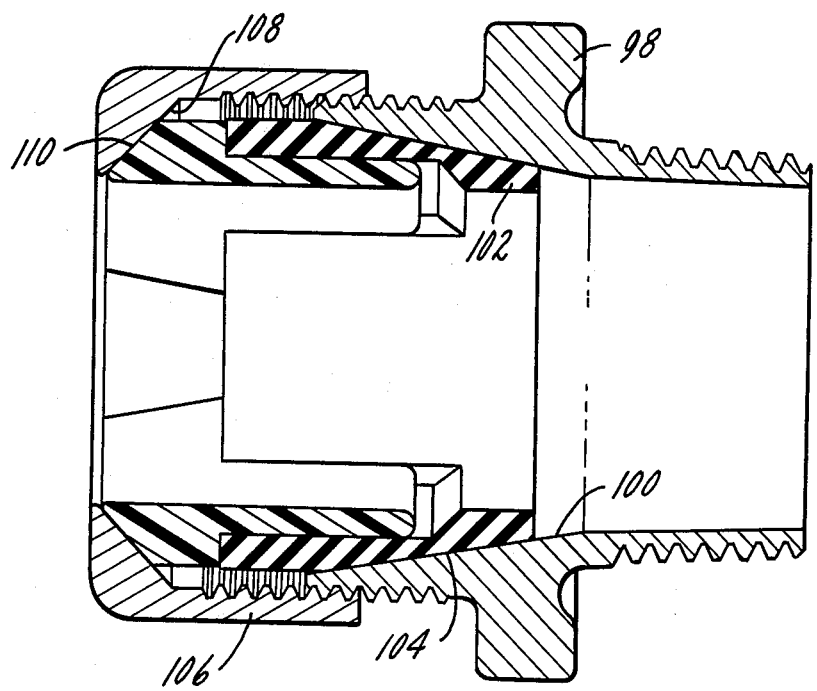
FIG. 12 is a side sectional view of a further variant.

In FIG. 12 a further variant has been shown in which the body or shell 98 is cast instead of a fabricated element with the inner surface being tapered or conical as at 100 thereby providing a tapered or conical seat for the rear of the grommet 102 which is correspondingly tapered as at 104. The cap 106 is also a cast unit in one piece with an inner tapered surface 108 opposing the forward tapered surface 110 of the gripper elements. Upon screwing the shell and cap together to reduce the axial dimension or length of the compression chamber, the forward portion of the gripper elements, i.e. the heads, will be forced inwardly again performing the pivoting action, depending upon the size of the cord, described previously.

The use, operation and function of the invention are as follows:

Whereas various forms have been shown and described, the basic function of all is generally the same with variations being permitted depending upon the size of the cord, the durometer of its jacket, etc.

If the cord is small, reduction of the volume of the compression chamber will first cause a pivoting action of the gripper elements about the rear of their shanks. The forward biting edge of the gripper element heads at some point will engage the outer surface of the cord. Then, depending upon the durometer of the cord, pivoting will continue about the rear of the shanks or the inclined faces 56 of the gripper elements will tend to parallel. It is possible that the pivot points or fulcrums 58 on the inner edge of the gripper faces will come together and thereafter a further pivoting action will take place about the fulcrum which will cause the rear end of the gripper shank to move outwardly distorting the grommet further.

On the other hand, if the cord is large, for example the maximum size, the edge 60 may start biting into the jacket of the cord immediately.

The action of the gripper elements and how its movements affect the distortable grommet is a complex or dynamic balance and varies from one size of cord to another. It also varies depending upon the durometer of the jacket of the cord. If the maximum cord size is being used, the action will be of one type, whereas if the minimum cord size is used you get a different action. The same is true of the durometer of the cord jacket.

As an example, if the cord is small, the gripper elements will pivot first about the rear ends of the shanks so that the inclined faces 56 tend to come together to a parallel position. But if a big cord is being used, the forward edge 60 of the gripper elements tends to start compressing the outer jacket of the cord and the so-called pivot points 58 or fulcrum may never come together. This is particularly true if the insulation of the jacket is tough or hard. But if the cord insulation or jacket is fairly soft, after sufficient indentation during the pivoting action about the rear end of the shanks, the pivot points 58 may come together or contact and further pivoting will be controlled by the inclined faces 56.

This is to say that the action is different depending upon whether the pivot points 58 ever contact or not. And this will affect what action the rear ends of the shanks perform which in turn will affect what distortion is applied to the grommet itself.

Figure 3:
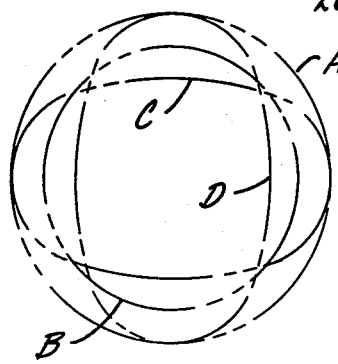
FIG. 3 is a schematic of part of the action involved.

When the shanks pivot out thereby compressing or distorting the material of the grommet outside of them, the material will be distorted both axially, circumferentially and radially which causes the grippers to operate on one elliptical basis, shown at C in FIG. 3, and the grommet to distort 90° out of phase therewith as at D.

The built in or enlarged area 66 in the grommet is important because this participates in the elliptical gripping D.

The movement of the grippers is a compound movement. The diagonal surfaces 56 tend to straighten out and become parallel rather than a clear pivot. But any movement of this nature is a pivoting movement about the rear of the shanks.

There is a balancing of forces involved rather than a fixed mechanical dimensioning. The forces involved are between the material of the grommet and the grippers, which may be nylon, and between the material of the grommet and the grippers, and between the material of the cord jacket and the grommet material. The material of the grommet will always move in the direction of minimum resistance.

The unit has the advantage that it will accommodate itself to a lot of variables and it will have a very high pull out force.

Whereas the preferred form and several variations of the invention have been shown and suggested, it should be understood that suitable additional modifications, changes, substitutions and alterations may be made without departing from the invention's fundamental theme.

The embodiments of the invention in which an exclusive property or privilege is claimed are defined as follows:

1. In a cord grip, a variable volume compression chamber defined by two interfitting parts screw threaded together and having a cord passage therethrough, a generally annular grommet in the compression chamber made of a flexible material having the general characteristics of rubber as to compressibility and distortability, a plurality of separate gripper elements having forward gripping areas disposed about the annular grommet and having opposed inner surfaces adapted to cause a rocking motion of the gripper elements when the volume of the compression chamber is axially reduced thereby causing the forward gripping areas to close on the cord disposed through the grommet.

2. The structure of claim 1 in which each of the gripper elements is releasably socketed into the flexible grommet so as to form a unit therewith.

3. The structure of claim 1 further characterized in that each gripper element has a generally axially disposed shank extending therefrom into the grommet.

4. The structure of claim 1 further characterized in that the gripper elements have opposed inner surfaces which are spaced from each other and define at least a part of the cord passage, and further including opposed inclined surfaces on the gripper elements adapted to contact each other initially in a limited area upon reduction of the volume of the compression chamber, the limited area of the inclined surfaces functioning generally as a pivot thereafter upon further reduction of the volume of the compression chamber.

5. The structure of claim 4 further characterized in that the inclined surfaces terminate outwardly in a biting portion.

6. The structure of claim 1 further characterized in that the gripper element has a head at the forward end thereof and a shank at the rear end, the shank being socketed into the grommet with the head extending from the front of the grommet.

7. The structure of claim 6 further characterized in that the shank of each of the gripper elements has a forced fit with the grommet.

8. The structure of claim 6 further characterized in that the shank of each of the gripper elements is arcuate in lateral cross section.

9. The structure of claim 8 further characterized in that the shank of each of the gripper elements is disposed in a relief on the inner surface of the grommet.

10. The structure of claim 8 further characterized in that the shank of each of the gripper elements is fitted into a closed socket in the body of the grommet.

11. In a cord grip, interfitting parts defining a generally annular compression chamber with a cord receiving central passage therethrough, the parts being screw threaded together so that relative rotation varies the axial dimension and therefore the volume of the chamber, gripper elements in the front of the compression chamber constructed and arranged to perform a closing and gripping action on a cord in response to reduction in the volume of the compression chamber, and a sealing grommet in the rear of the compression chamber interfitting with the gripper elements such that at least a part of the closing action of the gripper elements distorts at least a part of the grommet into an out-of-round condition thus effecting a seal on the cord.

12. The structure of claim 11 in which each of the gripper elements is releasably socketed into the flexible grommet so as to form a unit therewith.

13. The structure of claim 11 further characterized in that each of the gripper elements has a generally axially disposed shank extending therefrom into the grommet.

14. The structure of claim 11 further characterized in that the gripper elements have opposed inner surfaces which are spaced from each other and define at least a part of the cord passage, and further including opposed inclined surfaces on the gripper elements adapted to contact each other initially in a limited area upon reduction of the volume of the compression chamber, the limited area of the inclined surfaces functioning generally as a pivot thereafter upon further reduction of the volume of the compression chamber.

15. The structure of claim 11 further characterized in that the inclined surfaces terminate outwardly in a biting portion.

16. The structure of claim 11 further characterized in that each of the gripper elements has a head at the forward end thereof and a shank at the rear end, the shank being socketed into the grommet with the head extending from the front of the grommet.

17. The structure of claim 16 further characterized in that the shank of each of the gripper elements has a forced fit with the grommet.

18. The structure of claim 16 further characterized in that the shank of each of the gripper elements is arcuate in lateral cross section.

19. The structure of claim 18 further characterized in that the shank of each of the gripper elements is disposed in a relief on the inner surface of the grommet.

20. The structure of claim 18 further characterized in that the shank of each of the gripper elements is fitted into a closed socket in the body of the grommet.

21. In a cord grip, a variable volume compression chamber with an axial cord receiving passage therethrough and defined by at least two interfitting parts which are screw threaded together so that rotation of one relative to the other reduces the axial dimension, and therefore the volume, of the chamber, a gripping and sealing unit in the chamber including two elements, a grommet in the rear and a set of grippers in the front, the grommet being generally annular and having a central passage for the cord, the set of grippers being disposed around the cord passage and including at least two independent gripper elements, each having a forwardly disposedd head and a rearwardly disposed shank integral therewith and joined thereto at a rearwardly facing shoulder positioned so that the shoulder engages the front of the grommet and the shank extends into the grommet, the forward outer surface of each of the gripper elements being beveled so that axial reduction of the volume of the compression chamber tends to tends to bias the heads of the gripper elements radially inwardly in a pivoting action so that the shanks tend to distort the grommet radially.

22. The structure of claim 21 further characterized in that the compression chamber closely surrounds the outer surface of the grommet such that the radial distortion thereof by the shanks of the gripper elements is translated circumferentially and inward radially into a gripping and sealing action on the cord.

23. The structure of claim 21 further characterized in that the shanks of the gripper elements terminate in spaced relationship to the inner end of the grommet, the portion of the grommet between the inner end of the grommet and the inner ends of the gripper element shanks extending inwardly so as to provide a full encircling annulus defining a part of the cord passage, the inside diameter of the annulus being approximately the same as the outside diameter of the maximum cord size to be used with the cord grip.

24. For use in a cord grip in which a variable volume compression chamber with an axial cord receiving passage therethrough is defined by at least two interfitting screw threaded parts which upon rotation of one relative to the other reduces the axial dimension, and therefore the volume, of the chamber, the improvement comprising a gripping and sealing unit for use in such a chamber including two elements, an annular grommet and grippers extending from the front thereof, the grommet having a central passage therethrough for the cord and the grippers being disposed so as to define a forward part of the cord passage and including at least two independent gripper elements, each having a forwardly disposed head and a rearwardly disposed shank integral therewith and socketed into the grommet so as to form a unit with the grommet.

25. The structure of claim 24 further characterized in that each rearwardly disposed shank is joined to the head at a rearwardly facing shoulder which is positioned so that the shoulder engages the front of the grommet and the shank extends into the grommet.

26. The structure of claim 24 further characterized in that each shank is arcuate in lateral cross section so that it generally conforms to the outer and inner curvature of the grommet.

27. In a cord grip, interfitting parts defining a generally annular compression chamber with a cord receiving central passage therethrough, the parts being screw threaded together so that relative rotation reduces the axial dimension and therefore the volume of the chamber, independent gripper elements in the front of the chamber constructed to perform a closing and gripping action on a cord in response to reduction in the volume of the chamber, a distortable generally annular grommet in the rear of the chamber, and an interfit between each of the gripper elements and the grommet such that in response to reduction of the chamber volume each of the gripper element pivots about a lateral center in the grommet.

28. The structure of claim 27 further characterized in that the interfit between the gripper elements and grommet also distorts at least a part of the inside of the grommet into an out-of-round condition thus effecting a seal on a cord positioned therethrough.

29. The structure of claim 27 further characterized in that each of the gripper elements has a forwardly disposed head and a rearwardly disposed shank socketed into the grommet.

30. The structure of claim 29 further characterized in that each of the rearwardly disposed shanks is joined to the head at a rearwardly facing shoulder which abuts the front of the grommet and the shank extends therefrom into the grommet.

31. The structure of claim 30 further characterized in that each shank is arcuate in lateral cross section so that it generally conforms to the outer and inner curvature of the grommet.

32. The structure of claim 31 further characterized in that the shanks of the gripper elements terminate in spaced relationship to the inner end of the grommet, the portion of the grommet between the inner end of the grommet and the inner ends of the gripper element shanks extending inwardly so as to provide a full encircling annulus defining a part of the cord passage, the inside diameter of the annulus being approximately the same as the outside diameter of the maximum cord size to be used with the cord grip.

33. The structure of claim 32 further characterized in that the shank of each of the gripper elements is disposed in a relief in the inner surface of the grommet.

34. The structure of claim 32 further characterized in that the shank of each of the gripper elements is fitted into a closed socket in the body of the grommet.

35. The structure of claim 32 further characterized in that the shank of each of the gripper elements has a forced fit with the grommet.

36. The structure of claim 35 further characterized in that the shank of each of the gripper elements and the relief in the inner surface of the grommet are both arcuate in lateral cross section and are swung on different centers to as to provide an interference fit.

37. The structure of claim 35 further characterized in that the shank of each of the gripper elements and the relief in the grommet are both arcuate in cross section, the arc of the shank being slightly longer than the arc of the relief so as to provide an interference fit.

* * * * *